H. S. BLACKMORE.
PROCESS OF MAKING AMMONIA, ALKYL AMMONIA, OR AMMONIA BASES.
APPLICATION FILED MAR. 29, 1909.
974,742. Patented Nov. 1, 1910.
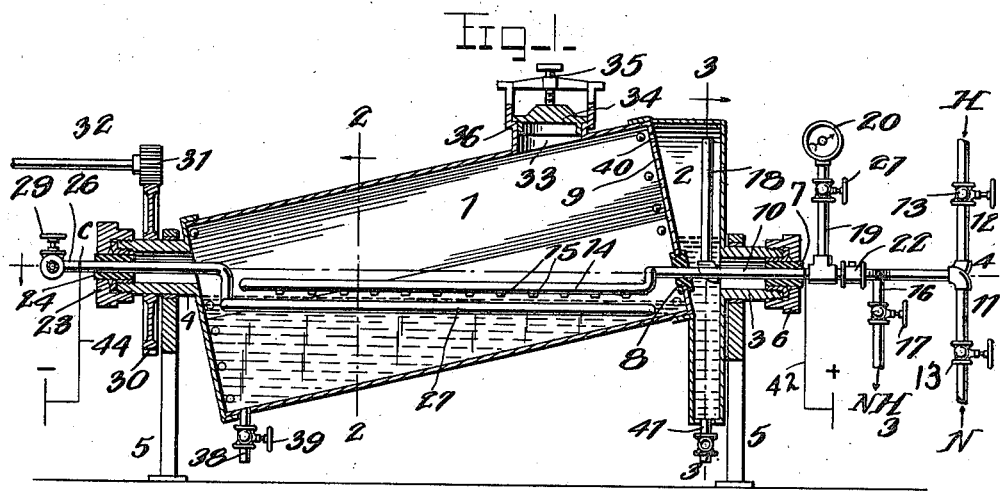
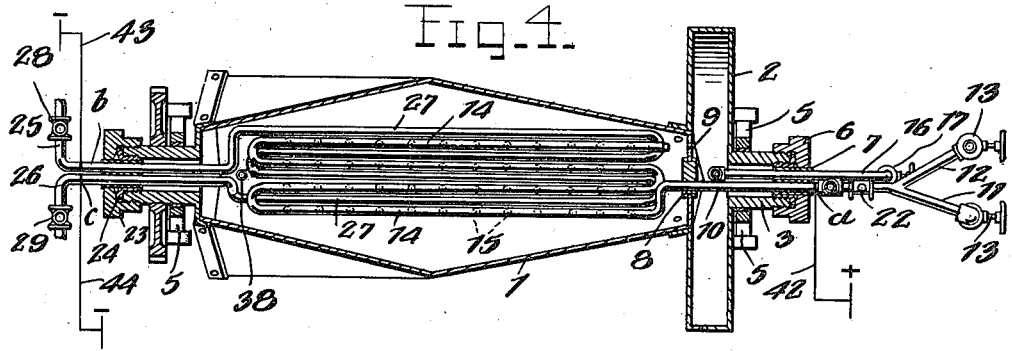
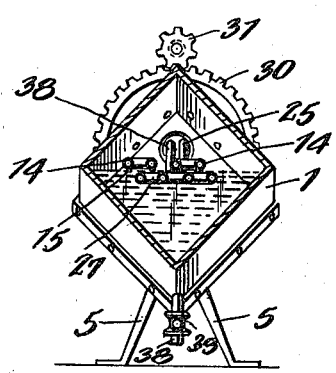
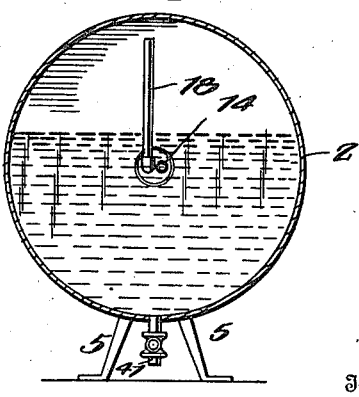
Witnesses
Inventor
Henry Spencer Blackmore

UNITED STATES PATENT OFFICE.

HENRY SPENCER BLACKMORE, OF MOUNT VERNON, NEW YORK, ASSIGNOR TO ROBERT E. ROBINSON AND DANIEL C. SPRUANCE, TRUSTEES, OF NEW YORK, N. Y.

PROCESS OF MAKING AMMONIA, ALKYL AMMONIA, OR AMMONIA BASES.

974,742.  Specification of Letters Patent.  Patented Nov. 1, 1910.

Original application filed November 23, 1908, Serial No. 463,980. Divided and this application filed March 29, 1909. Serial No. 486,390.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Making Ammonia, Alkyl Ammonia, or Ammonia Bases, of which the following is a specification.

The object of this invention is to produce ammonia or other ammonium compounds containing hydrogen, carbon and nitrogen, and consists in uniting or combining nitrogen with hydrogen, or hydrogen carbid, or substances containing the same, in a yielding state, such as methane or natural gas, by the action of a form of energy by friction, attrition, or agitation of, or with, substances, such as mercury, communicating therewith, and preferably a substance like mercury capable of amalgamating with ammonium, thereby augmenting the process of combination by its natural affinity for ammonium and facilitating the union of nitrogen with hydrogen, or substances containing the same, by its contact action therewith, and further facilitating the union by assimilating or associating the mercury with calcium, palladium, etc., or similar metal having a natural affinity for hydrogen, thereby acting as an intermediary or carrier of hydrogen to the energized nitrogen, being a division of an application filed Nov. 23, 1908, Serial No. 463,980.

In carrying out my invention for the production of ammonia and alkyl-ammonia, such as methyl amin of the mono, di, or tri variety, I provide a receptacle containing mercury and subject it to rapid agitation by shaking or otherwise moving the same, or the mercury therein, and then introducing into or through the agitated mercury nitrogen and hydrogen carbid, such as methane or substances containing the same, such as natural gas, whereby the nitrogen is caused to combine or unite with the hydrogen of the carbid in the presence of the mercury forming the ammonia ($NH_3$), and alkyl-ammonia or ammonia bases, some of which, together with a portion of the hydrogen, unites with the mercury producing ammonium amalgam, which may be finally recovered as ammonia by heating the amalgam so formed. By introducing the nitrogen and hydrogen in a heated condition, either individually or collectively, the formation of ammonia is facilitated and the formation of ammonimum amalgam is largely prevented, or by heating the mercury before or during the passage therethrough of the nitrogen and hydrogen, this result is also attained.

It can be seen that the formation of ammonia from nitrogen and hydrogen or hydrogen carbid can be continuously performed by passing a current of nitrogen and hydrogen through the agitated mercury, preferably heated, and the ammonia, alkyl-ammonia, or ammonia bases thus formed, collected or recovered by passing the resultant gaseous product into or through an absorbent agent, such as water, or preferably acidulated water, such as dilute sulfuric or hydrochloric acid, in which case ammonium sulfate or chlorid is produced, or it may be secured in any other convenient manner.

Instead of passing the nitrogen and hydrogen carbid through agitated mercury, I can atomize the mercury with a blast of compressed nitrogen and hydrogen carbid or cause the substances to be rapidly associated or agitated in any convenient manner.

I find it of advantage to employ mercury containing calcium, the latter of which assists or facilitates the union of nitrogen and hydrogen of hydrogen carbid by absorbing the hydrogen at ordinary temperatures, transiently forming intermediately, so-called, calcium hydrid, which is broken up into ammonia by action of the nitrogen, which with hydrogen forming ammonium amalgam. Particles of metallic calcium, or so-called calcium hydrid, may be employed instead of or without mercury, but it is found that the presence of mercury is greatly advantageous, as it facilitates the action of the calcium or similar contact substance at ordinary temperatures and also prevents the action of calcium on the lining or walls of the container, especially if it be of glass or enamel. Exposing nitrogen and hydrogen carbid to the action of agitated combining agents while under pressure also increases the yield of ammonia and is a preferred way of introducing the gases.

Many other substances than mercury may be employed to induce the combination of nitrogen and hydrogen carbid by agitation, attrition, or friction, such as sharp sand or silica, in which case it is preferable to heat the nitrogen and hydrogen and produce a sand blast by action of said heated gases under pressure; upon the subsidence of said hot blast, the gases to a large degree will be found to have combined, forming ammonia, which can be absorbed, collected, or recovered in any convenient manner. I find it, however, of advantage to employ contact, agitating, or frictional substances which have a natural affinity for ammonium at low temperature and from which it can be readily liberated by simply elevating the temperature, such as mercury, or mercury and calcium.

In employing mercury or amalgams as agitating or combining agents, it is found that by passing a current of electricity through the metal during agitation with the nitrogen and hydrogen, that union and formation of ammonia, alkyl-ammonia, or ammonia bases, is further facilitated by the numerous electric sparks produced by the rapid completing and breaking of the electric current circuit throughout the mass during agitation, which means is preferably employed for the additional feature of heating the mercury for liberating any ammonia which may, with nitrogen, have formed an amalgam during the progress of the process. Instead of agitating the mercury or other combining agent mechanically, it can be agitated by forcing a rapid stream of nitrogen and hydrogen carbid, or other fluid or solid, through or in contact with the same.

In the accompanying drawings, I have illustrated an apparatus especially adapted for carrying out my new and improved process, and in which:

Figure 1, is approximately a vertical, longitudinal section; Fig. 2, a transverse section on line 2—2 of Fig. 1; Fig. 3, a similar section on line 3—3 of Fig. 1, and Fig. 4, a horizontal, longitudinal section on line 4—4 of Fig. 1.

Referring to the several views, the numeral 1 indicates a rotatable rectangular vessel or receptacle, having one of its ends provided with a circular chamber 2, the axial center of which is at one of the corners of said vessel, where it is provided with a hollow journal arm 3, communicating with said chamber, and the other end of the vessel is provided, at the corner diagonally opposite the arm 3, with a similar journal arm 4, in communication with said vessel, the vessel being journaled in suitable standards or supports 5, 5. The outer end of the journal arm 3 is closed by a stuffing-box 6, and passing through an insulting section 7, in said stuffing-box and a similar section 8, in the partition 9, between the vessel and the chamber 2, is an inlet-pipe 10, terminating at its outer end in branches 11 and 12, each branch being provided with a regulating valve 13, the inner end of the inlet-pipe 10, within the vessel, terminates in a coil 14, closed at the end and provided with a plurality of small perforated projections 15, the purpose of which will be hereinafter explained. Also passing through the stuffing-box 3, is a discharge-pipe 16, having its outer end provided with a valve 17, and its inner end terminating in a vertical extension 18, within the chamber 2. The inlet-pipe is provided with a pipe 19, carrying a pressure gage 20, to indicate the pressure, said pipe 19 being provided with a valve 21, and the inlet-pipe is provided with a check-valve 22, to prevent back pressure.

The outer end of the journal-arm 4, is closed by a stuffing-box 23, and passing through an insulated section 24, in said stuffing-box are inlet and outlet-pipes 25 and 26, respectively, of a heating or cooling coil 27, situated within the vessel. The inlet-pipe 27, is provided with a valve 28, and the outlet-pipe with a valve 29. The journal-arm 4, is provided with a gear-wheel 30, which meshes with a pinion 31, mounted on a drive-shaft 32, by means of which the vessel is rotated.

The vessel is provided with a charging-hole 33, closed by a cap 34, which is secured firmly in place by a screw 35, and is fluid tight by means of a gasket 36. The vessel is also provided with a discharge-pipe 38, controlled by a valve 39, and an orifice 40, in the partition 9, affords communication between the vessel and the chamber 2. The chamber 2 is provided with a valve-controlled discharge-pipe 41.

The inlet-pipe 10, is connected by a wire 42, with the positive pole of a suitable electrical source of supply, (not shown), and the inlet and discharge-pipes 25 and 26, are connected by wires 43 and 44, respectively, with the other or negative pole of said electrical source of supply, each pipe having its inner section suitably insulated from the outer section, as indicated at a, b, c.

As a concrete example of this process and the manner in which it is carried out in combination with the apparatus above described, the formation of ammonia and methyl amin from free nitrogen and methane, or substances containing the same, such as natural gas through the initiation of mercury or quicksilver will be taken. Mercury is introduced into the vessel 1, through the opening 33, until it reaches approximately a level communicating with the reticulated pipe 27, at which time the opening is closed. The coil 27, is brought into electrical communication with one terminal of a generator, or other source of supply, not shown, and the perforated, reticulated coil 14, is brought into communication with the opposite terminal of said supply. A refrigerating fluid is then caused to circulate through the coil 27, by opening valves 28 and 29, for the purpose of refrigerating and maintaining the mercury, communicating therewith, at a temperature approximately sixty degrees F., or below, i. e., at or below ordinary atmospheric temperature. Nitrogen gas is then supplied through pipe 11, and methane or natural gas through pipe 12, by opening the respective valves 13, said valves being so adjusted, with reference to the gas pressures, that a mixture of nitrogen and methane or natural gas in proportion approximately two of the former to four of the latter, by volume, is caused to be forced through the check-valve 22, into the vessel 1, through the perforations 15, at a pressure approximately fifty pounds, which pressure is ascertained by the gage 21.

As the mixture of nitrogen and hydrogen carbid, methane, or natural gas is introduced into vessel 1, the said vessel is caused to revolve rapidly by means of the gearing, thereby causing the mercury therein to be rapidly tumbled, oscillated, and agitated in contact or in communication with the mixture of nitrogen and hydrogen, in such a manner that the frictional or attritional effect thereof causes the nitrogen and hydrogen of the hydrogen carbid to combine, and in the presence of an excess of hydrogen, to temporarily unite with the mercury, producing so-called ammonium amalgam; the combining of the nitrogen and hydrogen, in the presence of mercury, being augmented by the action of electricity passing between the coils 27 and 14, in a rapidly interrupted manner, by the action of the falling, dashing, or agitated particles of mercury passing through or between the fixed coils in the revolving vessel 1. The mixture of nitrogen and hydrogen is continually and gradually forced into the revolving vessel in order to maintain a pressure therein of approximately sixty pounds, in order to compensate for the condensation and absorption occurring in said vessel during the formation of ammoniacal substances, and absorption or union of the same with or by the mercury. The nitrogen and hydrogen carbid, methane or natural gas is supplied to the apparatus in this manner for about three hours, when it is cut off by closing the respective valves 13. The refrigerating fluid is then discharged from the coil 27, by blowing the same out, and said coil is then caused to communicate with a steam-supply, not shown, the heat of which elevates the temperature of the ammonium amalgam, and causes it to decompose or dissociate, liberating ammonia-gas, alkyl-ammonia and free hydrogen, which escapes through the opening 40, into the chamber 2, from which it is discharged through the pipe or duct 18, and 16, on opening the valve 17, and from thence conveyed to a suitable reservoir, or absorbing or combining chamber, not shown, and after the separation of the ammonia and alkyl-ammonia from the associated hydrogen, the said hydrogen may be recovered in any convenient manner for future use. After exposing the substances in vessel 1, to the action of heat and electricity, during this second stage of the process for about one hour, the larger portion of the available ammonia and alkyl-ammonia will be found to have been discharged, at which time the valve 17, is closed, the steam discharged from coil 27, the revolution of the apparatus stopped, and the contents of the vessel 1, cooled by again passing the refrigerating fluid through coil 27. When the temperature of the mercury in vessel 1 has been reduced, by thus cooling, to a temperature approximately sixty degrees F., or below, more nitrogen and hydrogen is introduced by opening valves 13, the vessel 1 revolved and the process continued as before.

It is found advantageous to add to, or amalgamate with the mercury certain substances of so-called contact or catalytic nature, capable of facilitating the union of nitrogen and hydrogen of hydrogen carbid to form or produce ammonia and alkyl-ammonia, or transiently ammonium amalgam, such as calcium. By liquefying metal, such as calcium, at ordinary temperatures, having in a heated state an affinity for nitrogen and hydrogen, or both, by the action of fluid solvents, or liquefying agents, such as mercury, the affinity of said metal for nitrogen, hydrogen, or both, is induced, under ordinary atmospheric conditions of temperature, without the necessity of heating the same; furthermore, such calcium, or similar substance, acts as a so-called catalytic or contact agent in the formation of ammonia from free nitrogen and hydrogen in the presence of an agent of solvent combining or assimilating nature, such as mercury, with which it forms an amalgam, together with hydrogen, and from which it can be finally eliminated by dissociation or decomposing the amalgam by the action of heat.

Such metals as calcium having an affinity, in a heated state, for nitrogen, hydrogen, or both, when liquefied by the action of other substances, at ordinary temperatures, and especially when associated with substances capable of uniting with compounds of nitrogen and hydrogen, such as mercury, in the formation of mercury amalgam, are found to act with superior avidity in the fixation of nitrogen and hydrogen, and formation of compounds or compositions thereof without the assistance of heat from an extraneous or other source than is attained or obtained by the employment of such substances, *per se*, in a heated state.

In subjecting the substances employed in the formation of ammonia to the action of electricity, I do not desire to confine myself to any particular form or character of electricity, but intend to include any and all characters or forms which may be selectively adaptable to any particular case, or the production of any particular product, be it a frictional, pulsating, alternating, polyphase, of high or low tension, or otherwise. Neither do I desire to confine myself to the formation of ammonia, but intend to include and do include the application of the herein described process for the fixation of nitrogen with hydrogen, *per se*, or hydrogen compounds, or compositions, be they of ammoniacal, azoical, di-azoical, or other form of or character of nitrogen-hydrogen containing compounds, be they simple, compound, complex, or polymeric in nature, or in which the nitrogen may exist in combination at any possible atomicity.

The terms "ammoniacal" and "ammonia" employed herein, with reference to substances capable of uniting therewith, have reference to hydrogen ammonid, or so-called ammonium, ($NH_4$), as well as ammonia *per se*, and the designation of substances associated therewith, with which it will combine, to elements, compounds or compositions, such, for instance, as mercury and hydrogen, as a substance capable of uniting with ammonia, forming mercury-hydrogen ammonid, or ammonium amalgam.

The formation of ammoniacal compounds or compositions, in accordance with this process, may be carried on under reduced, or increased pressure, or both, and by the action of heat or refrigeration and the energy supplied to cause the union of the elements or substances to produce the product desired, may be derived from a source of heat, light, electricity, radio-activity, or other form, without departing from the spirit or scope of my invention.

It should be noted that an atmosphere of hydrogen containing nitrogen enough to form ammonium, is of such low density as to be looked upon, or produce a condition which ordinarily results, when mercury is agitated in rarefied atmosphere, when such mercury is agitated with the lighter gases, such as nitrogen containing hydrogen largely in excess of volume, such as four volumes of hydrogen to one of nitrogen.

Instead of employing mercury, which is fluid at ordinary temperature, as a medium for supplying energy and forming compounds containing nitrogen and hydrogen, I can employ molten metals, such as lead, or alloys of selective melting point, such as fusible metal, without departing from the spirit or scope of my invention.

I have found it of advantage to augment the process of synthetically forming nitrogen-hydrogen-containing compounds from their elements, or substances containing the same, in a yielding condition, as hereinbefore described, by exposing the combining or reacting substances to, or associating the same with, water, either as liquid, vapor or steam, or under conditions capable of producing a like state, whereby the formation and union of the nitrogen-hydrogen-containing compound or compounds, in, with, or through the associated combinable fluid, and its dissociation and decomposition, or evolution, is enhanced, and its recovery in a free, or utilizable condition, facilitated. The nitrogen-hydrogen compound thus obtained, in gaseous or other form, can then be secured in the form of suitable salts or compounds by combining the same with suitable acids, solvents, or neutralizing agents, which neutralizing agents may be alkaline in some cases, where the nitrogen-hydrogen-containing compound obtained is of more or less acid character, such as azoic, hydrocyanic acid, etc.

When employing substances containing hydrogen in a yielding or combining condition, such as methane, methyl ammonias are produced, such as methylamin, dimethylamin, trimethylamin, or methyl ammonium compounds or compositions may be formed. The preferable form of hydrogen containing substance, such as methane, being natural gas, which in some cases contains as high as ninety-six per cent. (96%) methane.

By employing such substances as methane or natural gas, nitrogen may be fixed in such a manner as to form compounds or salts with suitable acids, which are valuable as fertilizing agents. Other alkyl hydrids may also be substituted for methyl hydrid (methane) producing correspondingly high alkyl-ammonium compounds, without departing from the spirit of my invention. Other hydrogen carbid, or hydrogen-carbon compounds, such as hydrocarbons, may be substituted for alkyl hydrids or paraffin hydrocarbons, such as olefins, acetylenes, etc., so long as the hydrogen is present in such a form or condition as to unite with or take on nitrogen in the formation of ammonia bases or polymers, or condensation, or transformation products, or educts thereof.

Having now described my invention what I claim is:—

1. Process of making ammonia, alkyl-ammonia, or ammonia bases, which comprises supplying energy to nitrogen and hydrogen-containing compounds, in a yielding state, causing constituents thereof to unite, while in a non-oxidizing atmosphere and in the presence of a substance capable of uniting with ammoniacal substances.

2. Process of making ammonia, alkyl-ammonia, or ammonia bases, which comprises supplying energy to nitrogen and hydrogen-containing compounds, in a yielding state, causing constituents thereof to unite, while in a non-oxidizing atmosphere and in the presence of a substance capable of uniting with ammoniacal substances and augmenting the union by the action of a contact substance.

3. Process of making ammonia, alkyl-ammonia, or ammonia bases, which comprises supplying energy to nitrogen and hydrogen-containing compounds, in a yielding state, causing constituents thereof to unite, while in a non-oxidizing atmosphere and under pressure and in the presence of a substance capable of uniting with ammoniacal substances.

4. Process of making ammonia, alkyl-ammonia, or ammonia bases, which comprises supplying energy to nitrogen and hydrogen-containing compounds, in a yielding state, causing constituents thereof to unite, while in a non-oxidizing atmosphere and under pressure and in the presence of a substance capable of uniting with ammoniacal substances, and augmenting the union by the action of a contact substance.

5. Process of making ammonia alkyl-ammonia, or ammonia bases, which comprises supplying energy to nitrogen and hydrogen carbid, in a yielding state, causing constituents thereof to unite, while in a non-oxidizing atmosphere and in the presence of a substance capable of uniting with ammoniacal substances.

6. Process of making ammonia, alkyl-ammonia, or ammonia bases, which comprises supplying energy to nitrogen and hydrogen carbid, in a yielding state, causing constituents thereof to unite, while in a non-oxidizing atmosphere and in the presence of a substance capable of uniting with ammoniacal substances, and augmenting the union by the action of a contact substance.

7. Process of making ammonia, alkyl-ammonia, or ammonia bases, which comprises supplying energy to nitrogen and hydrogen carbid, in a yielding state, causing constituents thereof to unite, while in a non-oxidizing atmosphere and under pressure and in the presence of a substance capable of uniting with ammoniacal substances.

8. Process of making ammonia, alkyl-ammonia, or ammonia bases, which comprises supplying energy to nitrogen and hydrogen carbid, in a yielding state, causing constituents thereof to unite, while in a non-oxidizing atmosphere and under pressure and in the presence of a substance capable of uniting with ammoniacal substances, and augmenting the union by the action of a contact substance.

9. Process of making ammonia, alkyl-ammonia, or ammonia bases, which comprises supplying energy to nitrogen and alkyl-hydrid, in a yielding state, causing constituents thereof to unite, while in a non-oxidizing atmosphere and in the presence of a substance capable of uniting with ammoniacal substances.

10. Process of making ammonia, alkyl-ammonia, or ammonia bases, which comprises supplying energy to nitrogen and alkyl-hydrid, in a yielding state, causing constituents thereof to unite, while in a non-oxidizing atmosphere and in the presence of a substance capable of uniting with ammoniacal substances, and augmenting the union by the action of a contact substance.

11. Process of making ammonia, alkyl-ammonia, or ammonia bases, which comprises supplying energy to nitrogen and alkyl-hydrid, in a yielding state, causing constituents thereof to unite, while in a non-oxidizing atmosphere and under pressure and in the presence of a substance capable of uniting with ammoniacal substances.

12. Process of making ammonia, alkyl-ammonia, or ammonia bases, which comprises supplying energy to nitrogen and alkyl-hydrid, in a yielding state, causing constituents thereof to unite, while in a non-oxidizing atmosphere and under pressure and in the presence of a substance capable of uniting with ammoniacal substances, and augmenting the union by the action of a contact substance.

13. Process of making ammonia, alkyl-ammonia, or ammonia bases, which comprises supplying energy to nitrogen and methyl-hydrid, in a yielding state, causing constituents thereof to unite, while in a non-oxidizing atmosphere and in the presence of a substance capable of uniting with ammoniacal substances.

14. Process of making ammonia, alkyl-ammonia, or ammonia bases, which comprises supplying energy to nitrogen and methyl-hydrid, in a yielding state, causing constituents thereof to unite, while in a non-oxidizing atmosphere and in the presence of a substance capable of uniting with ammoniacal substances, and augmenting the union by the action of a contact substance.

15. Process of making ammonia, alkyl-ammonia, or ammonia bases, which comprises supplying energy to nitrogen and methyl-hydrid, in a yielding state, causing constituents thereof to unite, while in a non-oxidizing atmosphere and under pressure and in the presence of a substance capable of uniting with ammoniacal substances.

16. Process of making ammonia, alkyl-ammonia, or ammonia bases, which comprises supplying energy to nitrogen and methyl-hydrid, in a yielding state, causing constituents thereof to unite, while in a non-oxidizing atmosphere and under pressure and in the presence of a substance capable of uniting with ammoniacal substances, and augmenting the union by the action of a contact substance.

17. Process of making ammonia, alkyl-ammonia, or ammonia bases, which comprises supplying energy to nitrogen and natural gas, causing constituents thereof to unite, while in a non-oxidizing atmosphere and in the presence of a substance capable of uniting with ammoniacal substances.

18. Process of making ammonia, alkyl-ammonia, or ammonia bases, which comprises supplying energy to nitrogen and natural gas, causing constituents thereof to unite, while in a non-oxidizing atmosphere and in the presence of a substance capable of uniting with ammoniacal substances, and augmenting the union by the action of a contact substance.

19. Process of making ammonia, alkyl-ammonia, or ammonia bases, which comprises supplying energy to nitrogen and natural gas, causing constituents thereof to unite, while in a non-oxidizing atmosphere and under pressure and in the presence of a substance capable of uniting with ammoniacal substances.

20. Process of making ammonia, alkyl-ammonia, or ammonia bases, which comprises supplying energy to nitrogen and natural gas, causing constituents thereof to unite, while in a non-oxidizing atmosphere and under pressure and in the presence of a substance capable of uniting with ammoniacal substances, and augmenting the union by the action of a contact substance.

21. Process of making ammonia, alkyl-ammonia, or ammonia bases, which comprises supplying energy to nitrogen and hydrogen-containing compounds, in a yielding state, causing constituents thereof to unite, while in a non-oxidizing atmosphere and in the presence of a substance capable of uniting with ammoniacal substances and augmenting the union by the action of electricity.

22. Process of making ammonia, alkyl-ammonia, or ammonia bases, which comprises supplying energy to nitrogen and hydrogen-containing compounds, in a yielding state, causing constituents thereof to unite, while in a non-oxidizing atmosphere and in the presence of a substance capable of uniting with ammoniacal substances, and augmenting the union by the action of a contact substance and electricity.

23. Process of making ammonia, alkyl-ammonia, or ammonia bases, which comprises supplying energy to nitrogen and hydrogen-containing compounds, in a yielding state, causing constituents thereof to unite, while in a non-oxidizing atmosphere and under pressure and in the presence of a substance capable of uniting with ammoniacal substances, and augmenting the union by the action of electricity.

24. Process of making ammonia, alkyl-ammonia, or ammonia bases, which comprises supplying energy to nitrogen and hydrogen-containing compounds, in a yielding state, causing constituents thereof to unite, while in a non-oxidizing atmosphere and under pressure and in the presence of a substance capable of uniting with ammoniacal substances, and augmenting the union by the action of a contact substance and electricity.

25. Process of making ammonia, alkyl-ammonia, or ammonia bases, which comprises supplying energy to nitrogen and hydrogen carbid, in a yielding state, causing constituents thereof to unite, while in a non-oxidizing atmosphere and in the presence of a substance capable of uniting with ammoniacal substances, and augmenting the union by the action of electricity.

26. Process of making ammonia, alkyl-ammonia, or ammonia bases, which comprises supplying energy to nitrogen and hydrogen carbid, in a yielding state, causing constituents thereof to unite, while in a non-oxidizing atmosphere and in the presence of a substance capable of uniting with ammoniacal substances, and augmenting the union by the action of a contact substance and electricity.

27. Process of making ammonia, alkyl-ammonia, or ammonia bases, which comprises supplying energy to nitrogen and hydrogen carbid, in a yielding state, causing constituents thereof to unite, while in a non-oxidizing atmosphere and under pressure and in the presence of a substance capable of uniting with ammoniacal substances, and augmenting the union by the action of electricity.

28. Process of making ammonia, alkyl-ammonia, or ammonia bases, which comprises supplying energy to nitrogen and hydrogen carbid, in a yielding state, causing constituents thereof to unite, while in a non-oxidizing atmosphere and under pressure and in the presence of a substance capable of uniting with ammoniacal substances, and augmenting the union by the action of a contact substance and electricity.

29. Process of making ammonia, alkyl-ammonia, or ammonia bases, which comprises supplying energy to nitrogen and alkyl-hydrid, in a yielding state, causing constituents thereof to unite, while in a non-oxidizing atmosphere and in the presence of a substance capable of uniting with ammoniacal substances, and augmenting the union by the action of electricity.

30. Process of making ammonia, alkyl-ammonia, or ammonia bases, which comprises supplying energy to nitrogen and alkyl-hydrid, in a yielding state, causing constituents thereof to unite, while in a non-oxidizing atmosphere and in the presence of a substance capable of uniting with ammoniacal substances, and augmenting the union by the action of a contact substance and electricity.

31. Process of making ammonia, alkyl-ammonia, or ammonia bases, which comprises supplying energy to nitrogen and alkyl-hydrid, in a yielding state, causing constituents thereof to unite, while in a non-oxidizing atmosphere and under pressure and in the presence of a substance capable of uniting with ammoniacal substances, and augmenting the union by the action of electricity.

32. Process of making ammonia, alkyl-ammonia, or ammonia bases, which comprises supplying energy to nitrogen and alkyl-hydrid, in a yielding state, causing constituents thereof to unite, while in a non-oxidizing atmosphere and under pressure and in the presence of a substance capable of uniting with ammoniacal substances, and augmenting the union by the action of a contact substance and electricity.

33. Process of making ammonia, alkyl-ammonia, or ammonia bases, which comprises supplying energy to nitrogen and methyl-hydrid, in a yielding state, causing constituents thereof to unite, while in a non-oxidizing atmosphere and in the presence of a substance capable of uniting with ammoniacal substances, and augmenting the union by the action of electricity.

34. Process of making ammonia, alkyl-ammonia, or ammonia bases, which comprises supplying energy to nitrogen and methyl-hydrid, in a yielding state, causing constituents thereof to unite, while in a non-oxidizing atmosphere and in the presence of a substance capable of uniting with ammoniacal substances, and augmenting the union by the action of a contact substance and electricity.

35. Process of making ammonia, alkyl-ammonia, or ammonia bases, which comprises supplying energy to nitrogen and methyl-hydrid, in a yielding state, causing constituents thereof to unite, while in a non-oxidizing atmosphere and under pressure and in the presence of a substance capable of uniting with ammoniacal substances, and augmenting the union by the action of electricity.

36. Process of making ammonia, alkyl-ammonia, or ammonia bases, which comprises supplying energy to nitrogen and methyl-hydrid, in a yielding state, causing constituents thereof to unite, while in a non-oxidizing atmosphere and under pressure and in the presence of a substance capable of uniting with ammoniacal substances, and augmenting the union by the action of a contact substance and electricity.

37. Process of making ammonia, alkyl-ammonia, or ammonia bases, which comprises supplying energy to nitrogen and natural gas, causing constituents thereof to unite, while in a non-oxidizing atmosphere and in the presence of a substance capable of uniting with ammoniacal substances, and augmenting the union by the action of electricity.

38. Process of making ammonia, alkyl-ammonia, or ammonia bases, which comprises supplying energy to nitrogen and natural gas, causing constituents thereof to unite, while in a non-oxidizing atmosphere and in the presence of a substance capable of uniting with ammoniacal substances, and augmenting the union by the action of a contact substance and electricity.

39. Process of making ammonia, alkyl-ammonia, or ammonia bases, which comprises supplying energy to nitrogen and natural gas, causing constituents thereof to unite, while in a non-oxidizing atmosphere and under pressure and in the presence of a substance capable of uniting with ammoniacal substances, and augmenting the union by the action of electricity.

40. Process of making ammonia, alkyl-ammonia, or ammonia bases, which comprises supplying energy to nitrogen and natural gas, causing constituents thereof to unite, while in a non-oxidizing atmosphere and under pressure and in the presence of a substance capable of uniting with ammoniacal substances, and augmenting the union by the action of a contact substance and electricity.

In testimony whereof I affix my signature in presence of two witnesses.

HENRY SPENCER BLACKMORE.

Witnesses:
H. N. JENKINS,
F. A. MILLIGAN.